United States Patent
Kim et al.

(10) Patent No.: US 10,317,734 B2
(45) Date of Patent: Jun. 11, 2019

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Su Jeong Kim, Seoul (KR); Oh Jeong Kwon, Hwaseong-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 435 days.

(21) Appl. No.: 14/303,843

(22) Filed: Jun. 13, 2014

(65) Prior Publication Data

US 2015/0029455 A1    Jan. 29, 2015

(30) Foreign Application Priority Data

Jul. 24, 2013   (KR) ........................ 10-2013-0087491

(51) Int. Cl.
   *G02F 1/1337*   (2006.01)

(52) U.S. Cl.
   CPC .. *G02F 1/133753* (2013.01); *G02F 1/133788* (2013.01); *G02F 2001/133726* (2013.01); *G02F 2001/133761* (2013.01); *G02F 2001/133773* (2013.01)

(58) Field of Classification Search
   CPC ............. G02F 1/133707; G02F 1/1393; G02F 1/133753; G02F 1/133788; G02F 2001/133726; G02F 2001/133773; G02F 2001/133761
   USPC ........................................................ 349/129
   See application file for complete search history.

(56) References Cited

U.S. PATENT DOCUMENTS

| 6,927,825 | B1 | 8/2005 | Koma et al. |
| 7,142,259 | B2 | 11/2006 | Hattori et al. |
| 7,589,812 | B2 | 9/2009 | Matsuyama |
| 8,094,278 | B2 | 1/2012 | Hanaoka et al. |
| 2007/0247578 | A1 | 10/2007 | Yang et al. |
| 2009/0002588 | A1* | 1/2009 | Lee ................... G02F 1/133707 349/42 |

(Continued)

FOREIGN PATENT DOCUMENTS

| CN | 102213872 | 10/2011 |
| CN | 102326119 | 1/2012 |

(Continued)

OTHER PUBLICATIONS

The Extended European Search Report for European Patent Application No. 14177942.1 dated Nov. 3, 2014.

(Continued)

*Primary Examiner* — Nathanael R Briggs
*Assistant Examiner* — William D Peterson
(74) *Attorney, Agent, or Firm* — Cantor Colburn LLP

(57) ABSTRACT

A liquid crystal display includes a thin film transistor panel including a first alignment layer, an opposing panel including a second alignment layer, and opposite to the thin film transistor panel, and a liquid crystal layer between the thin film transistor panel and the opposing panel, and including liquid crystal molecules, wherein a difference between a pretilt angle provided by the first alignment layer and a pretilt angle provided by the second alignment layer is equal to or greater than about 0.8 degree.

10 Claims, 10 Drawing Sheets

(56) References Cited

U.S. PATENT DOCUMENTS

| | | | |
|---|---|---|---|
| 2011/0096259 A1* | 4/2011 | Lee | G02B 5/201 |
| | | | 349/41 |
| 2011/0128487 A1 | 6/2011 | Kim | |
| 2011/0141417 A1* | 6/2011 | Kim | G02F 1/133788 |
| | | | 349/123 |
| 2012/0020056 A1* | 1/2012 | Yamagata | G02F 1/133308 |
| | | | 362/97.1 |
| 2012/0218500 A1 | 8/2012 | Nakamura et al. | |
| 2012/0314168 A1 | 12/2012 | Kang et al. | |
| 2013/0027640 A1 | 1/2013 | Lee et al. | |
| 2013/0038804 A1 | 2/2013 | Li et al. | |
| 2013/0258262 A1* | 10/2013 | Lee | G02F 1/133707 |
| | | | 349/123 |

FOREIGN PATENT DOCUMENTS

| | | |
|---|---|---|
| CN | 102650767 | 8/2012 |
| JP | 2004294605 A | 10/2004 |
| JP | 2008-276061 A | 11/2008 |
| JP | 2010-097028 A | 4/2010 |
| JP | 2011095696 A | 5/2011 |
| JP | 2011221505 A | 11/2011 |
| JP | 2012177784 A | 9/2012 |
| KR | 10-0740928 B1 | 7/2007 |
| KR | 10-1171181 B1 | 7/2012 |

OTHER PUBLICATIONS

Japanese Office Action for Application No. 2014-147822 dated Jan. 9, 2018.

\* cited by examiner

LIQUID CRYSTAL DISPLAY AND MANUFACTURING METHOD THEREOF

This application claims priority to Korean Patent Application No. 10-2013-0087491 filed on Jul. 24, 2013, and all the benefits accruing therefrom under 35 U.S.C. § 119, the entire contents of which are incorporated herein by reference.

BACKGROUND (a) Field

The invention relates to a liquid crystal display and a manufacturing method thereof.

(b) Description of the Related Art

A liquid crystal display ("LCD"), which is one of the flat panel displays widely used presently, includes two panels on which electrodes are formed, and a liquid crystal layer interposed therebetween, generates an electric field by applying a voltage to the electrodes, rearranges liquid crystal molecules of the liquid crystal layer, and adjusts transmittance of light through the rearranged liquid crystal molecules to display an image.

The LCD uses an alignment layer in order to arrange the liquid crystal molecules of the liquid crystal layer in a desired direction. Further, in a case where the electric field is applied to the liquid crystal layer, in order to predetermine a direction of a movement of the liquid crystal molecules, the liquid crystal molecules are arranged to have a pretilt. In order to achieve the pretilt of the liquid crystal molecule, a method of mixing and photopolymerizing reactive mesogen in the liquid crystal layer is known.

Recently, a size of the LCD has been increased, and in order to improve immersion and realism for viewers, a curved display panel has been developed as illustrated in FIG. 1.

SUMMARY

Since a boundary of a display panel is fixed by a sealant, when the display panel is bent, buckling is generated at a center portion of a panel, and thus two panels of the display panel are misaligned. The misalignment of the panels causes a partial deviation in the directions of pretilts formed in the two panels in a plurality of same directions, so that a dark portion, such as texture, is generated in a pixel, thereby degrading a display quality.

The invention has been made in an effort to provide a liquid crystal display ("LCD") having an excellent display quality, and a manufacturing method thereof.

Further, the invention has been made in an effort to provide an LCD effectively preventing a quality of an image from deteriorating due to a distortion of an alignment between the two panels in a curved display panel, and a manufacturing method thereof.

An exemplary embodiment of the invention provides a liquid crystal display including a thin film transistor ("TFT") panel including a first alignment layer, an opposing panel including a second alignment layer, and opposite to the TFT panel, and a liquid crystal layer including liquid crystal molecules between the TFT panel and the opposing panel, in which a difference between a pretilt angle provided by the first alignment layer and a pretilt angle provided by the second alignment layer is equal to or greater than about 0.8 degree.

In the invention, a pretilt may include a direction and an angle, and a pretilt direction may refer to an angle at which a long axis of a liquid crystal molecule projected on a substrate surface is inclined based on a gate line or a data line, and a pretilt angle may also refer to an angle at which the long axis of the liquid crystal molecule is inclined based on a line vertical to a horizontal surface of the substrate.

In an exemplary embodiment, the first alignment layer and the second alignment layer may include a same alignment material.

In an exemplary embodiment, the first alignment layer may include a first alignment adjusting layer and a first pretilt adjusting layer, and the second alignment layer may include a second alignment adjusting layer and a second pretilt adjusting layer, in which the first pretilt adjusting layer defines a thin film transistor panel-side pretilt angle of the liquid crystal molecules, and the second pretilt adjusting layer defines an opposing panel-side pretilt angle of the liquid crystal molecules.

In an exemplary embodiment, the opposing panel-side pretilt angle by the second pretilt adjusting layer may be smaller than the thin film transistor panel-side pretilt angle by the first pretilt adjusting layer.

In an exemplary embodiment, the first and second alignment adjusting layers may include a polymer including a vertical alignment material, and the first and second pretilt adjusting layers include polymers including reactive mesogen.

In an exemplary embodiment, the TFT panel may further include a pixel electrode including a plurality of fine branch portions, and the polymers including the reactive mesogen of the first and second pretilt adjusting layer may be arranged in a direction of the plurality of fine branch portions.

In an exemplary embodiment, the LCD may include a curved display panel including the TFT panel and the opposing panel.

Another exemplary embodiment of the invention provides a method of manufacturing a liquid crystal display including manufacturing a TFT panel and an opposing panel opposite to the TFT panel, applying an alignment material onto each of the thin film transistor panel and the opposing panel, forming alignment layers by curing the alignment material of each of the thin film transistor panel and the opposing panel, exposing only one of the thin film transistor panel and the opposing panel to ultraviolet rays ("UV"), forming a liquid crystal layer and bonding the thin film transistor panel and the opposing panel, and exposing the bonded panels to UV electric field.

In an exemplary embodiment, a difference between a pretilt angle provided by the alignment layer on the TFT panel and a pretilt angle provided by the alignment layer formed the opposing panel may be equal to or greater than about 0.8 degree.

In an exemplary embodiment, the applying an alignment material may include applying a same alignment material including reactive mesogen onto each of the TFT panel and the opposing panel.

In an exemplary embodiment, the opposing panel may be exposed to the UV.

In an exemplary embodiment, the alignment layers may include an alignment adjusting layer and a pretilt adjusting layer.

In an exemplary embodiment, the exposing only one of the two panels to UV may include exposing only one of the two panels to UV to UV with an intensity of approximately 5 joules per square centimeter ($J/cm^2$) to approximately 30 $J/cm^2$ for about 20 minutes to about 1 hour.

In an exemplary embodiment, the method may include baking the TFT panel and the opposing panel at different temperatures, respectively, before the forming of the liquid crystal layer and the bonding of the two panels.

Another exemplary embodiment of the invention is to provide a method of manufacturing a liquid crystal display including manufacturing a TFT panel and an opposing panel opposite to the TFT panel, applying an alignment material onto each of the thin film transistor panel and an opposing panel, forming alignment layers by curing the alignment material of each of the thin film transistor panel and an opposing panel, in which the thin film transistor panel and an opposing panel are baked at different temperatures, respectively, forming a liquid crystal layer and bonding the thin film transistor panel and an opposing panel, and exposing the bonded panels to an UV electric field.

In an exemplary embodiment, a difference between a pretilt angle provided by the alignment layer on the TFT panel and a pretilt angle provided by the alignment layer formed the opposing panel may be equal to or greater than about 0.8 degree.

In an exemplary embodiment, the applying a alignment material may include applying a same alignment material including reactive mesogen onto each of the TFT panel and the opposing panel.

In an exemplary embodiment, the forming the alignment layers may include differentiating pre-curing temperatures and/or main-curing temperatures for the alignment materials of the respective panels.

In an exemplary embodiment, the alignment material applied onto the opposing panel may be subjected to pre-curing at a lower temperature than that of the alignment material applied onto the TFT panel. In this case, the former may be subjected to main-curing at a higher temperature than or the same temperature as that of the latter.

In an exemplary embodiment, the alignment material applied onto the opposing panel may be subjected to main-curing at a higher temperature than that of the alignment material applied onto the TFT panel. In this case, the former may be subjected to pre-curing at a lower temperature than or the same temperature as that of the latter.

In an exemplary embodiment, the alignment layers may include an alignment adjusting layer and a pretilt adjusting layer.

In an exemplary embodiment, the method may further include exposing only one of the two panels to UV before the forming of the liquid crystal layer and the bonding of the two panels.

According to the exemplary embodiments of the invention, even though an LCD is implemented with a curved LCD panel, it is possible to decrease or effectively prevent a dark portion, such as a texture, on a screen.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
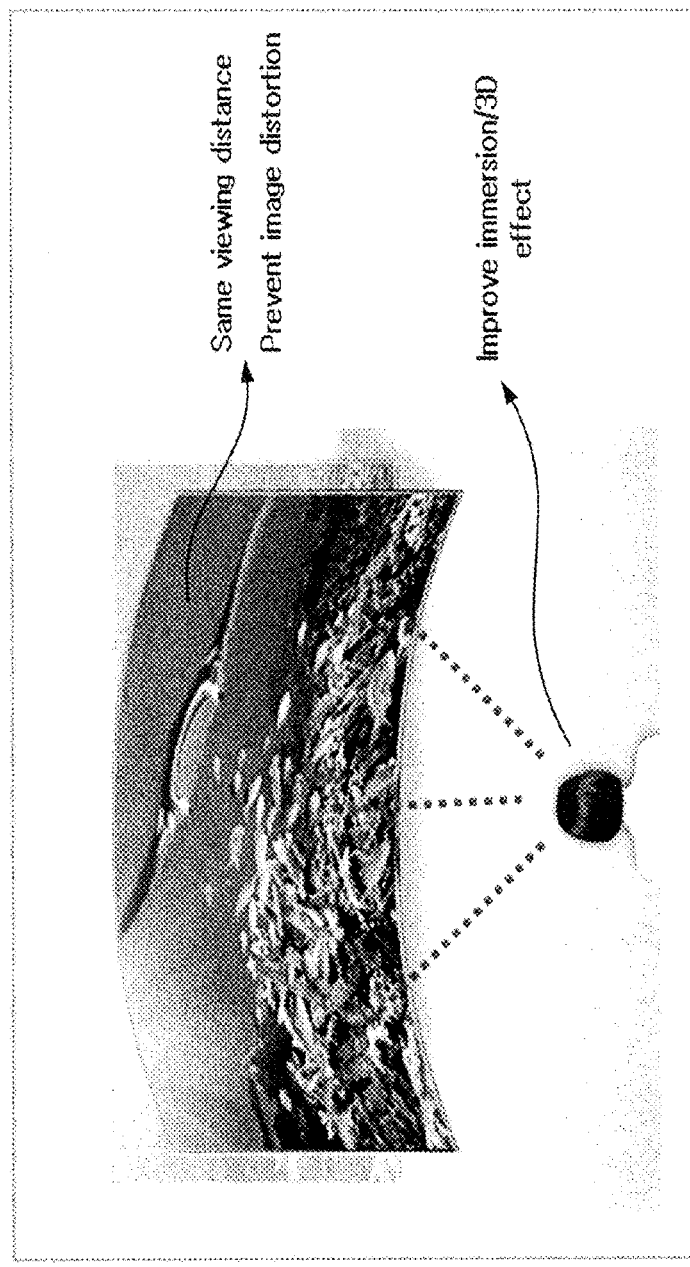
FIG. 1 is a diagram illustrating an exemplary embodiment of a curved liquid crystal display ("LCD") according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Now, a liquid crystal display ("LCD") according to an exemplary embodiment of the invention will be described in detail with reference to the accompanying drawings.

Figure 2:
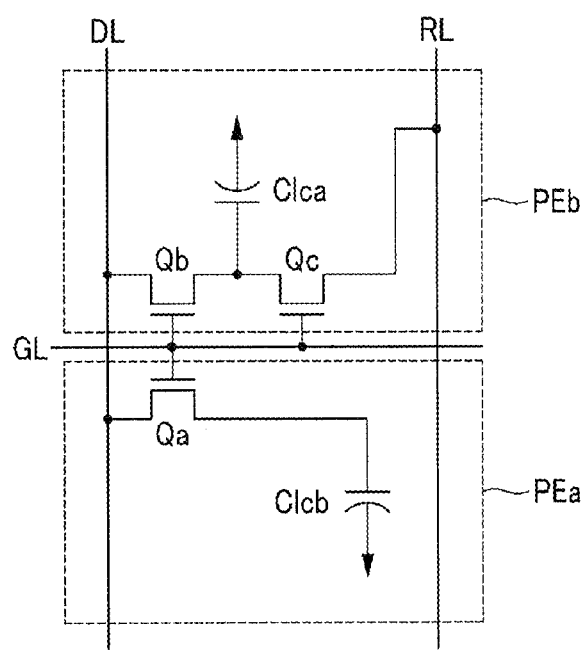
FIG. 2 is an equivalent circuit diagram for the exemplary embodiment of one pixel of the LCD according to the invention.

FIG. 2 is an equivalent circuit diagram for one pixel of an LCD according to an exemplary embodiment of the invention. A disposition of signal lines and pixels of the LCD according to the exemplary embodiment of the invention, and a driving method thereof will be described with reference to FIG. 2.

A pixel PX of the LCD may include a plurality of signal lines including a gate line GL transferring a gate signal, a data line DL transferring a data signal, and a voltage dividing reference voltage line RL transferring a voltage dividing reference voltage, first, second, and third switching elements Qa, Qb, and Qc connected to the signal lines, and first and second liquid crystal capacitors Clca and Clcb.

The first and second switching elements Qa and Qb are connected to the gate line GL and the data line DL, respectively, and the third switching element Qc is connected to an output terminal of the second switching element Qb and the voltage dividing reference voltage line RL. The first switching element Qa and the second switching element Qb are three terminal elements, such as a thin film transistor ("TFT"), and control terminals thereof are connected with the gate line GL, and input terminals thereof are connected with the data line DL. An output terminal of the first switching element Qa is connected to the first liquid crystal capacitor Clca, and an output terminal of the second switching element Qb is connected to input terminals of the second liquid crystal capacitor Clcb and the third switching element Qc. The third switching element Qc is also a three terminal element, such as a TFT, and a control terminal thereof is connected with the gate line GL, an input terminal thereof is connected with the second liquid crystal capacitor Clcb, and an output terminal thereof is connected with the voltage dividing reference voltage line RL.

When a gate-on signal is applied to the gate line GL, the first switching element Qa, the second switching element Qb and the third switching element Qc connected to the gate line GL are turned on. As a result, a data voltage applied to the data line is applied to a first subpixel electrode PEa and a second subpixel electrode PEb through the turned-on first switching element Qa and second switching element Qb. Since the data voltages applied to the first subpixel electrode PEa and the second subpixel electrode PEb are the same as each other, the first liquid crystal capacitor Clca and the second liquid crystal capacitor Clcb are charged with the same voltage value as a difference value between a common voltage and the data voltage, but simultaneously, the voltage charged in the second liquid crystal capacitor Clcb is divided through the turned-on third switching element Qc. Accordingly, the voltage charged in the second liquid crystal capacitor Clcb is decreased by a difference between the common voltage and the voltage dividing reference voltage.

The voltage charged in the first liquid crystal capacitor Clca and the voltage charged in the second liquid crystal capacitor Clcb are changed, so that inclined angles of liquid crystal molecules in the first subpixel and the second subpixels are different, and thus luminance between the two subpixels is different. When the voltage of the first liquid crystal capacitor Clca and the voltage of the second liquid crystal capacitor Clcb are appropriately adjusted, an image viewed from a side can be maximally close to an image viewed from a front side, thereby improves side visibility.

In the illustrated exemplary embodiment, the pixel PX includes the second liquid crystal capacitor Clcb and the third switching element Qc connected to the voltage dividing reference voltage line RL in order to make the voltage charged in the first liquid crystal capacitor Clca and the voltage charged in the second liquid crystal capacitor Clcb be different from each other, but may be differently configured depending on an exemplary embodiment. In an exemplary embodiment, the second liquid crystal capacitor Clcb may be connected to a step-down capacitor, for example. Particularly, the pixel PX may include the third switching element Qc including a first terminal connected to a step-down gate line, a second terminal connected to the second liquid crystal capacitor Clcb, and a third terminal connected to the step-down capacitor, so that some of an amount of charges charged in the second liquid crystal capacitor Clcb is charged in the step-down capacitor and thus the charged voltages of the first liquid crystal capacitor Clca and the second liquid crystal capacitor Clcb may be differently set from each other. In another exemplary embodiment, the first liquid crystal capacitor Clca and the second liquid crystal capacitor Clcb may be connected to different data lines, so as to receive different data voltages, respectively, so that the charged voltages of the first liquid crystal capacitor Clca and the second liquid crystal capacitor Clcb may be differently set from each other.

Figure 3:
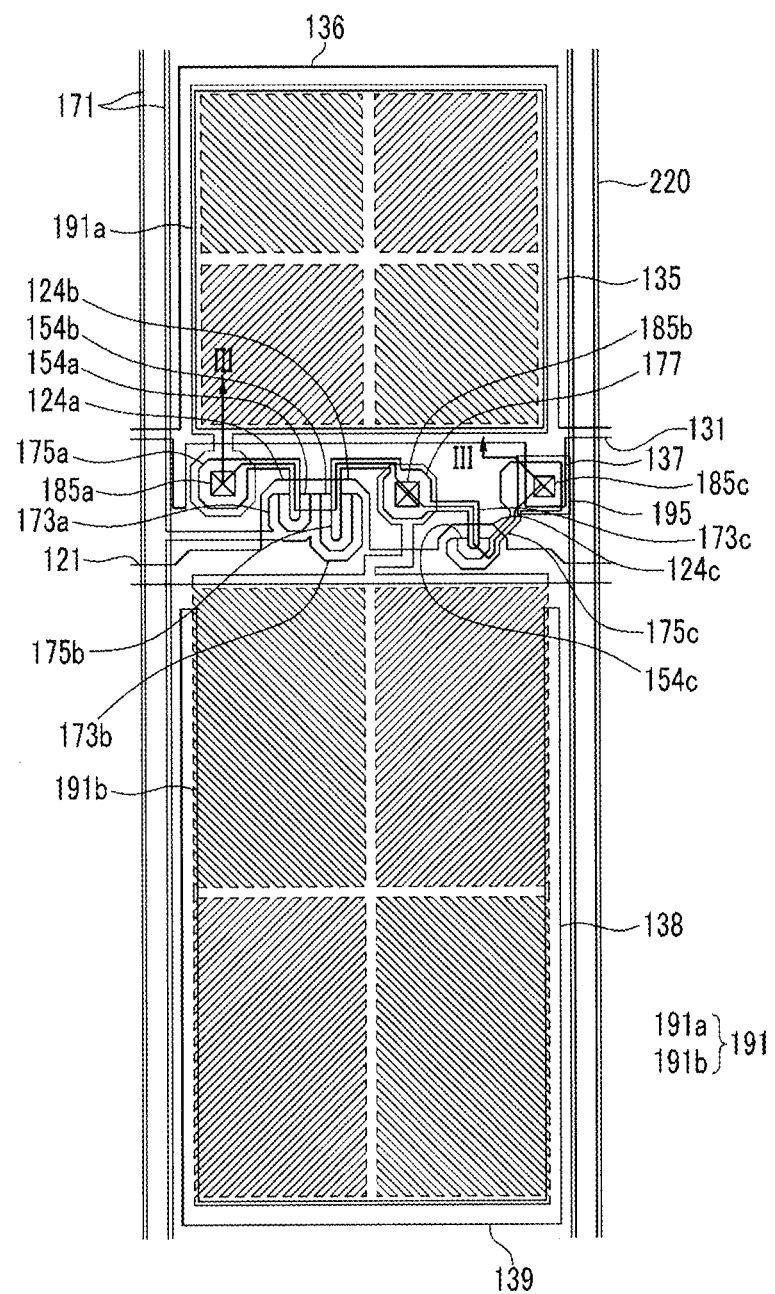
FIG. 3 is a plan view for the exemplary embodiment of one pixel of the LCD according to the invention.
Figure 4:
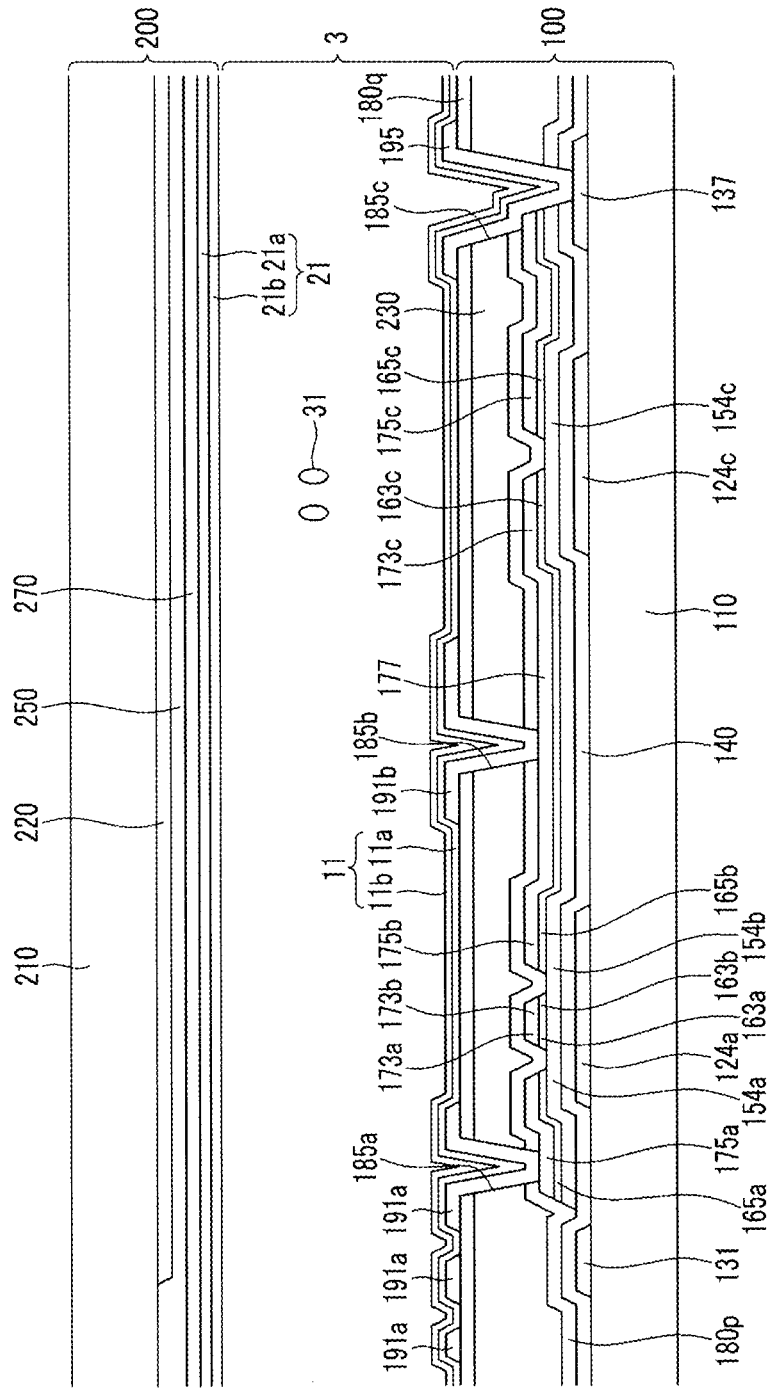
FIG. 4 is a cross-sectional view taken along line III-III of the LCD of FIG. 3.
Figure 5:
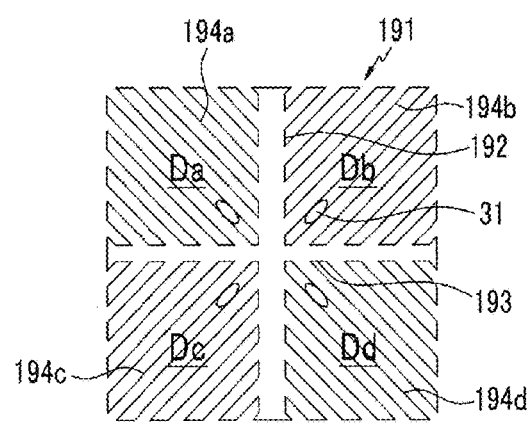
FIG. 5 is a top plan view illustrating to the exemplary embodiment of a basic region of a pixel electrode of the LCD according the invention.

A structure of the LCD according to the exemplary embodiment illustrated in FIG. 2 will be described with reference to FIGS. 3 to 5. FIG. 3 is a plan view illustrating an exemplary embodiment of one pixel of the LCD according to the exemplary embodiment of the invention, and FIG. 4 is a cross-sectional view taken along line III-III of the LCD of FIG. 3. FIG. 5 is a top plan view illustrating a basic region of a pixel electrode of the LCD according to the exemplary embodiment of the invention.

First, referring to FIGS. 3 and 4, the LCD according to the exemplary embodiment includes a lower panel 100 and an upper panel 200 facing each other, a liquid crystal layer 3 interposed between the lower and upper panels 100 and 200, and a pair of polarizers (not illustrated) attached to external surfaces of the lower and upper panels 100 and 200.

First, the lower panel 100 will be described.

A gate conductor including a gate line 121 and a voltage dividing reference voltage line 131 is disposed on an insulation substrate 110 including transparent glass or plastic. The gate line 121 includes a first gate electrode 124a, a second gate electrode 124b, a third gate electrode 124c and a wide end portion (not illustrated) for connecting with another layer or an external driving circuit. The voltage dividing reference voltage line 131 includes first storage electrodes 135 and 136 and a reference electrode 137. Further, second storage electrodes 138 and 139, which are not connected with the voltage dividing reference voltage line 131 but overlap the second subpixel electrode 191b, are also provided.

A gate insulation layer 140 is disposed on the gate line 121 and the voltage dividing reference voltage line 131, and a first semiconductor 154a, a second semiconductor 154b and a third semiconductor 154c are disposed on the gate insulation layer 140. A plurality of ohmic contacts 163a, 165a, 163b, 165b, 163c, and 165c is disposed on the semiconductors 154a, 154b and 154c.

A data conductor including a plurality of data lines 171 including a first source electrode 173a and a second source electrode 173b, a first drain electrode 175a, a second drain electrode 175b, a third source electrode 173c and a third drain electrode 175c is disposed on the ohmic contacts 163a, 165a, 163b, 165b, 163c and 165c and the gate insulation layer 140. The data conductor and the semiconductors and the ohmic contacts disposed under the data conductor may be simultaneously provided by using one mask. The data line 171 includes a wide end portion (not illustrated) for connecting with another layer or an external driving circuit.

The first gate electrode 124a, the first source electrode 173a, and the first drain electrode 175a provide the first TFT Qa together with a first semiconductor 154a, and a channel of the TFT is disposed on the semiconductor 154a between the first source electrode 173a and the first drain electrode 175a. Similarly, the second gate electrode 124b, the second source electrode 173b and the second drain electrode 175b provide the second TFT Qb together with a second semiconductor 154b, and a channel thereof is disposed on the semiconductor 154b between the second source electrode 173b and the second drain electrode 175b. The third gate electrode 124c, the third source electrode 173c and the third drain electrode 175c provide the third TFT Qb together with a third semiconductor 154c, and a channel is disposed on the semiconductor 154c between the third source electrode 173c and the third drain electrode 175c. The second drain electrode 175b is connected with the third source electrode 173c, and includes a widely expanded portion 177.

A first passivation layer 180p is disposed on the data conductors 171, 173c, 175a, 175b, and 175c, and exposed portions of the semiconductors 154a, 154b, and 154c. In an exemplary embodiment, the first passivation layer 180p may include an inorganic insulation layer, such as silicon nitride or silicon oxide. The first passivation layer 180p may effectively prevent a pigment of a color filter 230 from flowing in the exposed portions of the semiconductors 154a, 154b and 154c.

The color filter 230 is disposed on the first passivation layer 180p. The color filter 230 is extended in a vertical direction along adjacent two data lines.

A second passivation layer 180q is disposed on the color filter 230. In an exemplary embodiment, the second passivation layer 180q may include an inorganic insulation layer, such as silicon nitride or silicon oxide. The second passivation layer 180q effectively prevents the color filter 230 from being lifted up and suppresses a contamination of the liquid crystal layer 3 due to an organic material, such as a solvent, flowing in from the color filter 230, thereby effectively preventing a defect, such as an afterimage, which may be caused during the driving of a screen.

The first passivation layer 180p and the second passivation layer 180q are provided with a first contact hole 185a and a second contact hole 185b, through which the first drain electrode 175a and the second drain electrode 175b are exposed. The first passivation layer 180p, the second passivation layer 180q, and the gate insulation layer 140 are provided with a third contact hole 185c, through which a part of the reference electrode 137 and a part of the third drain electrode 175c are exposed, and a connection member 195 covers the third contact hole 185c. The connecting member 195 electrically connects the reference electrode 137 and the third drain electrode 175c exposed through the third contact hole 185c.

A plurality of pixel electrodes 191 is disposed on the second passivation layer 180q. The respective pixel electrodes 191 are separated from each other with the gate line 121 interposed therebetween, and include first subpixel electrode 191a and second subpixel electrode 191b adjacent in a column direction based on the gate line 121. In exemplary embodiments, the pixel electrode 191 may include a transparent conductive material, such as indium tin oxide ("ITO") and indium zinc oxide ("IZO"), or may include a reflective metal, such as aluminum, silver, chromium, and an alloy thereof.

Each of the first subpixel electrode 191a and the second subpixel electrode 191b include one or more basic electrodes illustrated in FIG. 5 or modifications of the basic electrode.

The first subpixel electrode 191a and the second subpixel electrode 191b are physically and electrically connected with the first drain electrode 175a and the second drain electrode 175b through the first contact hole 185a and the second contact hole 185b, respectively, and receives the data voltage from the first drain electrode 175a and the second drain electrode 175b. Some of the data voltage applied to the second drain electrode 175b is divided through the third source electrode 173c, so that a magnitude of the voltage applied to the first subpixel electrode 191a is larger than a magnitude of the voltage applied to the second subpixel electrode 191b.

The first subpixel electrode 191*a* and the second subpixel electrode 191*b*, to which the data voltage is applied, generate an electric field together with a common electrode 270 of the upper panel 200 to be described below so as to determine a direction of the liquid crystal molecule of the liquid crystal layer 3 between the two electrodes 191 and 270. Luminance of light passing through the liquid crystal layer 3 is changed according to the determined direction of the liquid crystal molecule as described above.

A lower alignment layer 11 is disposed on the pixel electrode 191. The lower alignment layer 11 includes an alignment adjusting layer 11*a* and a pretilt adjusting layer 11*b*.

The alignment adjusting layer 11*a* includes a polymer including a vertical alignment material. In an exemplary embodiment, the alignment adjusting layer 11*a* may be a polymer including a dianhydride-based monomer, such as an alicyclic dianhydride-based monomer, for example, a diamine-based monomer, such as an aromatic diamine-based monomer and an aliphatic ring substituted aromatic diamine-based monomer, for example, and an aromatic epoxide-based monomer that is a crosslinker. In an exemplary embodiment, the alignment adjusting layer 11*a* may include at least one of polymer-based materials, such as polyamide, polyamic acid, polysiloxane, nylon, polyvinyl-alcohol ("PVA"), and polyvinyl chloride ("PVC"), for example.

The pretilt adjusting layer 11*b* includes a polymer in which the vertical alignment material and a monomer including reactive mesogen ("RM") are chemically bonded to each other. In exemplary embodiments, the polymer included in the pretilt adjusting layer 11*b* may include a dianhydride-based monomer, such as an alicyclic dianhydride-based monomer, for example, and a diamine-based monomer, such as a photoactive diamine-based monomer, an alkylated aromatic diamine-based monomer and an aromatic diamine-based monomer, for example.

The photoactive diamine-based monomer of the polymer is a monomer including reactive mesogen, and serves to determine a direction of the pretilt of the pretilt adjusting layer 11*b* of the lower alignment layer 11. In an exemplary embodiment, the polymer of the alignment adjusting layer 11 and the polymer including the RM of the pretilt adjusting layer 11*b* may be chemically bonded to each other.

The RM is a material which is photo-cured by light such as ultraviolet rays ("UV"), for example, to limit the pretilt to one direction. In an exemplary embodiment, the RM may be a compound expressed by a formula below.

P1-A1-(Z1-A2)*n*-P2, where P1 and P2 are independently selected from acrylate, methacrylate, vinyl, vinyloxy and epoxy groups, A1 and A2 are independently selected from 1,4-phenylene and naphthalene-2,6-diyl groups, Z1 is one of COO—, OCO— and a single bond, and n is one of 0, 1 and 2.

In further detail, a compound expressed as one of the next equations can be exemplified.

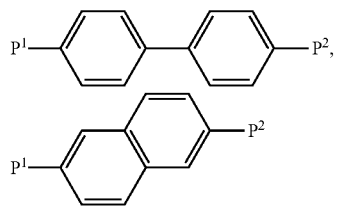

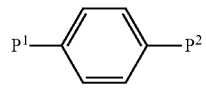

Here, P1 and P2 are independently selected from acrylate, methacrylate, vinyl, vinyloxy, or epoxy groups, for example.

Now, the upper panel 200 will be described.

A light blocking member 220 is disposed on an insulation substrate 210. The light blocking member 220 is also referred to as a black matrix, and effectively prevents a leakage of light. A plurality of openings (not illustrated) facing the pixel electrodes 191 is defined in the light blocking member 220 having almost the same shape as that of the pixel electrode 191 The light blocking member 220 effectively prevents a leakage of light between the pixel electrodes 191. The light blocking member 220 may include a portion corresponding to the gate line 121 and the data line 171, and a portion corresponding to the TFT. Depending on an exemplary embodiment, the light blocking member 220 may be disposed only on the lower panel 100, or may be disposed on both the upper and lower panels 100 and 200.

An overcoat 250 is disposed on the light blocking member. The overcoat 250 may include an organic insulating material, and provides a flat surface. Depending on an exemplary embodiment, the overcoat 250 may be omitted.

The common electrode 270 is disposed on the overcoat 250. The common electrode 270 may include a transparent conductor, such as ITO and IZO.

An upper alignment layer 21 is disposed on the common electrode 270. Similar to the lower alignment layer 11, the upper alignment layer 21 includes an alignment adjusting layer 21*a* and a pretilt adjusting layer 21*b*. Detailed configurations of the alignment adjusting layer 21*a* and the pretilt adjusting layer 21 and a relationship therebetween may be the same as those described in the lower alignment layer 11. The upper alignment layer 21 may include the same material as that of the lower alignment layer 11. In a case where the upper and lower alignment layers 21 and 11 include different materials each other, many problems, such as an afterimage, for example, may be caused. However, even though the upper alignment layer 21 and the lower alignment layer 11 include the same material, the angles of the pretilts provided by the alignment adjusting layer 21*a* of the upper alignment layer 21 and the alignment adjusting layer 11*a* of the lower alignment layer 11 may be different from each other.

The liquid crystal layer 3 includes a plurality of liquid crystal molecules 31, and the liquid crystal molecule 31 are aligned to be vertical to the surfaces of the two substrates 110 and 210 in a state where a voltage is not applied to the two electric field generating electrodes 191 and 270, and are aligned to have a pretilt inclined in the same direction as a longitudinal direction of a cutout pattern of the pixel electrode 191. The liquid crystal molecules 31 may be vertically aligned by the vertical alignment materials within the lower alignment layer 11 and the upper alignment layer 21, and the pretilts of the liquid crystal molecules 31 may be adjusted by the pretilt adjusting layer 11*b* of the lower alignment layer 11 and the pretilt adjusting layer 21*b* of the upper alignment layer 21.

The pretilt angles of the liquid crystal molecules 31 may be divided into a lower panel-side pretilt angle by the pretilt adjusting layer 11*b* of the lower alignment layer 11, and an upper panel-side pretilt angle by the pretilt adjusting layer 21*b* of the upper alignment layer 21, and the lower panel-side pretilt angle and the upper panel-side pretilt angle are different from each other. In an exemplary embodiment, the difference in the angle may be approximately 0.8 degrees or more, and the upper panel-side pretilt angle may be smaller than the lower panel-side pretilt angle.

A basic electrode of the pixel electrode 191 will be described with reference to FIG. 5.

As shown in FIG. 5, an entire shape of the basic electrode is a quadrangle, and includes a cross-shaped stem portion including a horizontal stem portion 193 and a vertical stem portion 192 orthogonal to the horizontal stem portion 193. Further, the basic electrode is divided into a first sub region Da, a second sub region Db, a third sub region Dc and a fourth sub region Dd by the horizontal stem portion 193 and the vertical stem portion 192, and the first to fourth sub regions Da, Db, D, and Dd include a plurality of first fine branch portions 194*a*, a plurality of second fine branch portions 194*b*, a plurality of third fine branch portions 194*c* and a plurality of fourth fine branch portions 194*d*, respectively.

The first fine branch portion 194*a* is obliquely extended in a left upper direction from the horizontal stem portion 193 or the vertical stem portion 192, and the second fine branch portion 194*b* is obliquely extended in a right upper direction from the horizontal stem portion 193 or the vertical stem portion 192. The third fine branch portion 194*c* is obliquely extended in a left lower direction from the horizontal stem portion 193 or the vertical stem portion 192, and the fourth fine branch portion 194*d* is obliquely extended in a right lower direction from the horizontal stem portion 193 or the vertical stem portion 192.

The first to fourth fine branch portions 194*a*, 194*b*, 194*c*, and 194*d* form approximately 45 degrees or 135 degrees with respect to the gate lines 121*a* and 121*b* or the horizontal stem portion 193. Further, the fine branch portions 194*a*, 194*b*, 194*c*, and 194*d* of adjacent two sub regions of the first to fourth sub regions Da, Db, Dc, and Dd may be orthogonal to each other.

Widths of the fine branch portions 194*a*, 194*b*, 194*c*, and 194*d* may be about 2.5 micrometers (μm) to about 5.0 μm, and an interval between the fine branch portions 194*a*, 194*b*, 194*c*, and 194*d* adjacent within one sub region Da, Db, Dc, or Dd may be about 2.5 μm to about 5.0 μm. The widths and the intervals may be taken in a direction substantially perpendicular to a direction in which the branch portion extends (e.g., longitudinal direction).

According to the exemplary embodiment of the invention, the widths of the fine branch portions 194*a*, 194*b*, 194*c* and 194*d* may increase as being close to the horizontal stem portion 193 or the vertical stem portion 192, and a difference between a portion having the largest width and a portion having the smallest width in one fine branch portion 194*a*, 194*b*, 194, or 194*d* may be about 0.2 μm to about 1.5 μm.

The first subpixel electrode 191*a* and the second subpixel electrode 191*b* are connected with the first drain electrode 175*a* or the second drain electrode 175*b* through the first contact hole 185*a* and the second contact hole 185*b*, and receives a data voltage from the first drain electrode 175*a* and the second drain electrode 175*b*. In this case, sides of the first to fourth fine branch portions 194*a*, 194*b*, 194*c*, and 194*d* distort the electric field to create horizontal components determining a direction of the inclination of the liquid crystal molecules 31. The horizontal components of the electric field are almost horizontal to the sides of the first to fourth fine branch portions 194*a*, 194*b*, 194*c*, and 194*d*. Accordingly, as illustrated in FIG. 5, the liquid crystal molecules 31 are inclined in a direction parallel to the longitudinal direction of the fine branch portions 194*a*, 194*b*, 194*c*, and 194*d*. The pixel electrode 191 includes the four sub regions Da to Dd in which the longitudinal directions of the fine branch portions 194*a*, 194*b*, 194*c*, and 194*d* are different from each other, so that the directions, in which the liquid crystal molecules 31 are inclined, are approximately four directions, and four domains in which the alignment directions of the liquid crystal molecules 31 are different from each other are disposed on the liquid crystal layer 3. As described above, when varying the directions in which the liquid crystal molecules are inclined, a reference viewing angle of the LCD is increased.

Figure 6:
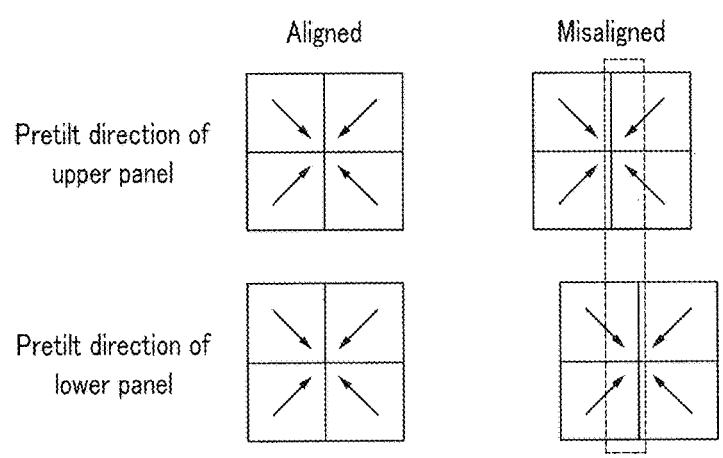
FIG. 6 is a diagram illustrating an exemplary embodiment of a misalignment of a pretilt direction due to the misalignment between upper and lower panels generated in the curved display panel.

Now, deterioration in display quality generable in the curved LCD will be described with reference to FIG. 6. FIG. 6 is a diagram illustrating an exemplary embodiment of a misalignment of a pretilt direction due to the misalignment between the upper and lower panels generated in the curved display panel.

Referring to FIGS. 4 and. 5 together, the liquid crystal molecule 31 of the liquid crystal layer 3 are aligned to have a pretilt inclined in the same direction as the longitudinal direction of a cutout pattern of the pixel electrode 191 in a state where an electric field is not applied, and for the pretilt of the liquid crystal molecules 31, the pretilt adjusting layers 11*b* and 21*b* disposed on the alignment layers 11 and 21 of the lower and upper panels 100 and 200 have the pretilt inclined in the same direction as the cutout pattern of the pixel electrode 191.

The pretilts of the pretilt adjusting layers 11*b* and 21*b* are provided in the same direction at a position at which the lower panel 100 and the upper panel 200 face each other, which may be expressed with an alignment state illustrated in a left drawing of FIG. 6. However, when the display panel is bent in order to provide the curved display panel, the alignment between the lower panel and the upper panel is distorted, and as a result, like a portion indicated with a dotted-line quadrangle of a right drawing of FIG. 6, there occurs a region in which the direction of the pretilt of the pretilt adjusting layer 11*b* of the lower panel 100 is misaligned with the direction of the pretilt of the pretilt adjusting layer 21*b* of the upper panel 200. A problem in the direction in which the liquid crystal molecules 31 are inclined is generated in the region, so that a texture is generated in the screen. According to the invention, in a case where the pretilt angle by the lower pretilt adjusting layer 11*b* and the pretilt angle by the upper pretilt adjusting layer 21*b* are differently provided from each other, it is possible to decrease or effectively prevent a generation of the texture generated on the screen.

Figure 7:
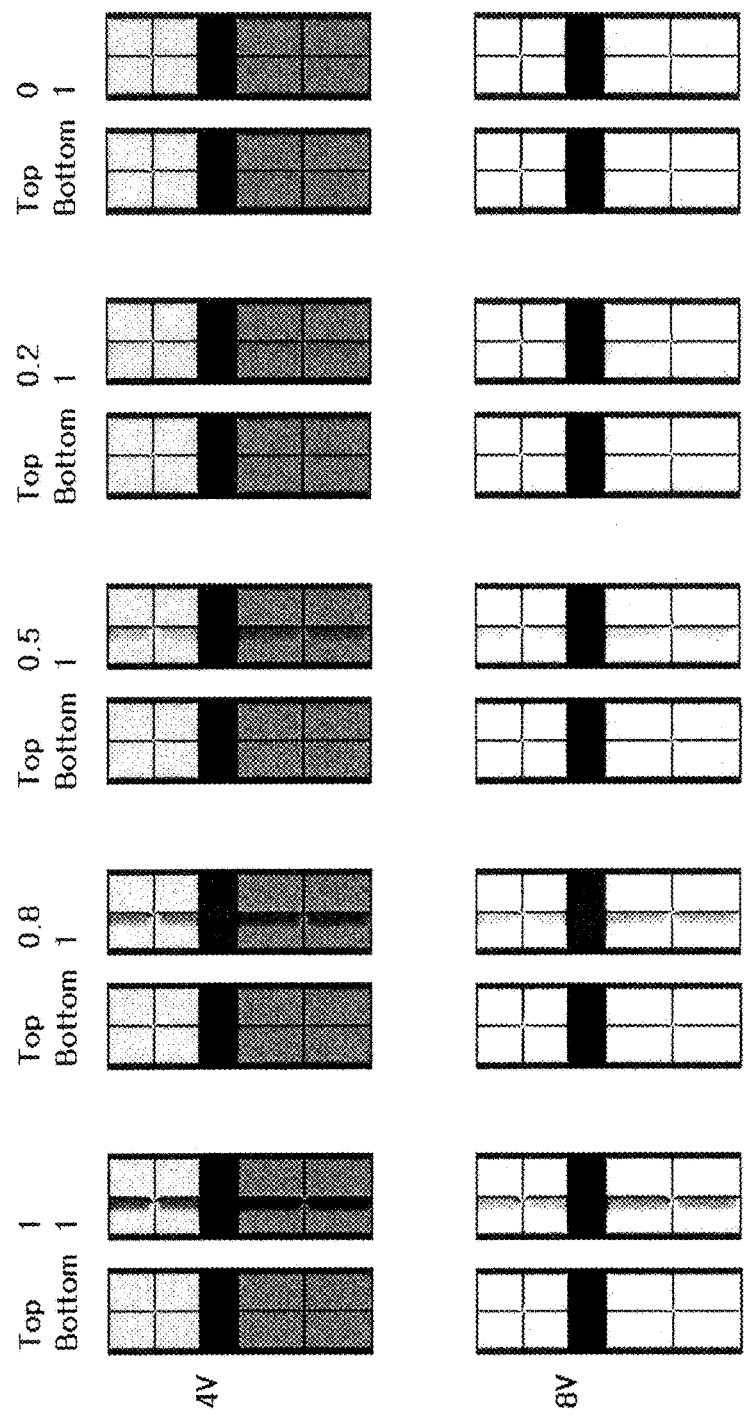
FIG. 7 is a diagram illustrating a display quality according to a difference between a lower panel-side pretilt angle and an upper panel-side pretilt angle as a simulation image.

FIG. 7 is a diagram illustrating a display quality according to a difference between the lower panel-side pretilt angle and the upper panel-side pretilt angle as a simulation image.

In FIG. 7, a voltage of 4 V is applied to five pairs of pixels positioned in an upper line, and a voltage of 8 V is applied to five pairs of pixels positioned in a lower line. In one pair of pixels in each line, a left side is a state in which an upper panel-side pretilt direction and a lower panel-side pretilt direction are aligned, and a right side is a state in which the upper panel-side pretilt direction and the lower panel-side pretilt direction are misaligned by 30 μm. A display state was simulated while gradually decreasing the upper panel-side pretilt angle from 1 degree to 0 degree in a state where the lower panel-side pretilt angle is fixed at 1 degree.

It can be seen that in both the upper and lower lines, as the upper panel-side pretilt angle is decreased, the generation of the texture is gradually weak, and when the pretilt angle is 0.2 degree, the texture is rarely generated, and when the pretilt angle is 0 degree, the texture completely disappears. A result of the simulation in the curved display panel for transmittance and luminance variation is represented in Table 1 below.

TABLE 1

| Pretilt (degree) | | | Transmittance Simulation (a.u.) | | |
|---|---|---|---|---|---|
| Lower panel | Upper panel | Delta | Aligned | 30 μm Misaligned | Luminance variation (%) |
| 1.0 | 0 | 1.0 | 0.17072 | 0.17072 | 0.0 |
|  | 0.2 | 0.8 | 0.17191 | 0.16988 | −1.2 |
|  | 0.5 | 0.5 | 0.17339 | 0.16651 | −4.0 |
|  | 0.8 | 0.2 | 0.17459 | 0.1625 | −6.9 |
|  | 1 | 0.0 | 0.17527 | 0.15955 | −9.0 |

Referring to Table 1, the delta represents a difference between the upper panel-side pretilt angle and the lower panel-side pretilt angle, and the transmittance simulation is measured in absorbance unit (a.u.). As represented in Table 1, when the lower panel and the upper panel are misaligned under a condition that both the lower panel-side pretilt angle and the upper panel-side pretilt angle are 1 degree, luminance is approximately decreased by 9 percent (%). When a difference between the pretilt angles is 0.8 degree or more, even though the alignment is distorted, luminance deviation is decreased to a level under approximately 1.2%, and when a difference between the pretilt angles is approximately 1 degree, the luminance deviation is 0.

Now, exemplary embodiments in which the alignment layer is provided so as to have a difference between the lower panel-side pretilt angle and the upper panel-side pretilt angle will be described with reference to FIGS. 8 to 10.

Figure 8:
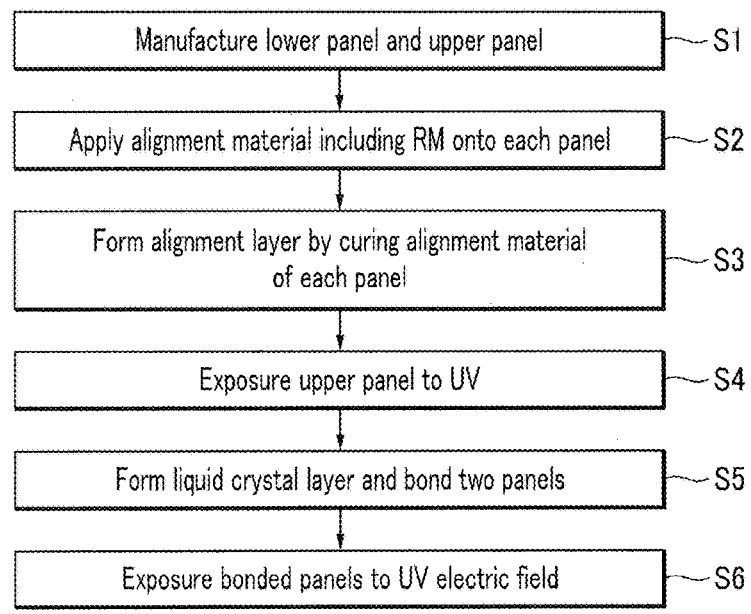
FIG. 8 is a flowchart of the exemplary embodiment of a manufacturing method of the LCD according to the invention.

FIG. 8 is a flowchart of a manufacturing method of the LCD according to the exemplary embodiment of the invention.

As illustrated in FIG. 8, first, a lower panel and an upper panel are manufactured (S1). Here, the manufacturing of the lower panel means manufacturing a TFT panel, except for a lower alignment layer. In an exemplary embodiment, the lower panel is manufactured by providing the gate conductor, the data conductor, the TFT, the color filter, the pixel electrode, and the like, which are disposed on the insulating substrate as described with reference to FIGS. 2 to 5. The manufacturing of the upper panel means manufacturing an opposing panel, except for an upper alignment layer, as an opposing panel of the TFT panel. In an exemplary embodiment, the upper panel is provided by providing a light blocking member, a common electrode, and the like on the insulating substrate. Depending on an exemplary embodiment, the light blocking member may be disposed only on the lower panel, or may be disposed on both the upper and lower panels.

Next, an alignment material including RM is applied onto the lower panel and the upper panel manufactured as described above (S2). The application of the alignment material may be performed by a method, such as inkjet printing and roll printing. In an exemplary embodiment, the alignment material applied onto the lower panel and the upper panel may be the same as each other. In an exemplary embodiment, the alignment layer is the same as that of the description given in relation to the alignment layer.

Next, an alignment layer including an alignment adjusting layer and a pretilt adjusting layer is provided by curing the alignment material applied onto each panel (S3). The curing of the alignment material may include pre-curing at a low temperature and main-curing at a high temperature.

The pre-curing is to heat the alignment material at, for example, approximately 70 degrees Celsius (° C.) to approximately 100° C., and a solvent of the alignment material is evaporated, and a combination within the alignment material is phase-separated by the pre-curing. The phase-separation is generated by a difference in a polarity of components within the alignment material, and a material having a relatively large polarity moves to a surrounding area of the electrode, and a material having a relatively small polarity moves above the surrounding area.

The main-curing is heating the alignment material at, for example, approximately 200° C. to approximately 250° C., and stacks the alignment layer, in which a material having a relatively large polarity, for example, a polymer layer providing the alignment adjusting layer, is disposed at a lower side, and a material having a relatively small polarity, for example, a polymer layer providing the pretilt adjusting layer, is disposed at an upper side. As described above, the polymer providing the pretilt adjusting layer is a polymer in which a monomer including RM is bonded to another monomer.

Next, only the upper panel is exposed to UV (S4). Accordingly, a part or the entirety of RM of the alignment layer disposed on the upper panel is photo-cured in a state where the pretilt is not provided. Accordingly, in the alignment layer of the upper panel, the amount of reactive mesogen, which is not photo-cured, arranged in the same direction as those of the liquid crystal molecules to form the pretilt during the exposure to a UV electric field later is decreased. The UV exposure may be continued for about 20 minutes to about 1 hour with an intensity of approximately 5 joules per square centimeter (J/cm$^2$) to approximately 30 J/cm$^2$, but is not limited thereto. Depending on an exemplary embodiment of the invention, the UV exposure may be performed only on the lower panel, not the upper panel.

Next, a liquid crystal layer is provided and the two panels are bonded to each other (S5). The forming of the liquid crystal layer may be performed before or after the bonding of the two panels. That is, liquid crystals are dropped onto any one panel by a method, such as inkjet printing, and then the other panel may be bonded to the one panel, and the two panels are bonded to each other and then liquid crystal may be injected through an injection opening between the two panels.

Next, the bonded panels are exposed to an ultraviolet ray electric field (S6). Here, as well known to those skilled in the art, the exposure to the UV electric field means changing an alignment so that the liquid crystal molecules have pretilts in a desired direction and angle by applying an electric field to the liquid crystal, and irradiating UV in a state where compounds including RM are arranged in the same direction as those of the liquid crystal molecules. When the UV are irradiated onto the compounds including RM arranged in the same direction as those of the liquid crystal molecules, RM is photo-cured. Accordingly, the compounds including RM of the pretilt adjusting layer is cured in a state of being arranged in the same direction as those of the liquid crystal molecules in a surrounding area.

However, the upper panel is already exposed to the UV in an operation S4, so that at least some of the RM of the upper panel is photo-cured. Accordingly, even though the panels are bonded and then are exposed to the UV electric field, the reactive mesogen, which is arranged in the same direction as those of the liquid crystal molecules to be photo-cured, may be less than that of the lower panel or may rarely exist.

Accordingly, the pretilt by the pretilt adjusting layer of the upper panel is smaller than the pretilt by the pretilt adjusting layer of the lower panel, so that a difference between the pretilt angles of the upper panel and the lower panel may be created.

Figure 9:
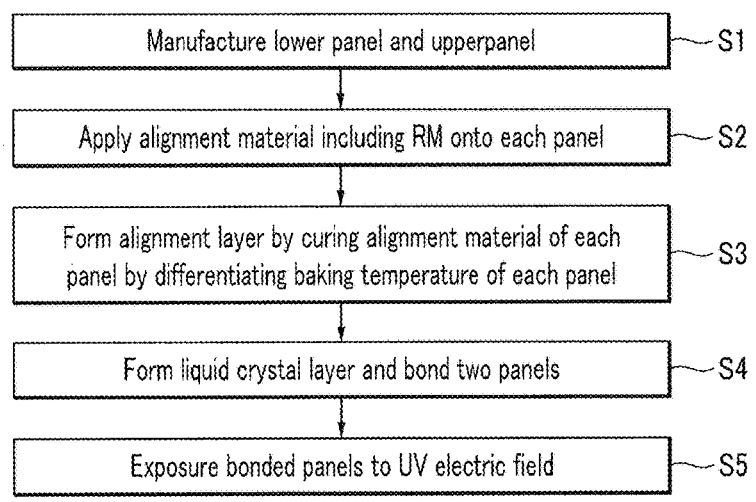
FIG. 9 is a flowchart of another exemplary embodiment of a manufacturing method of the LCD according to the invention.
Figure 10:
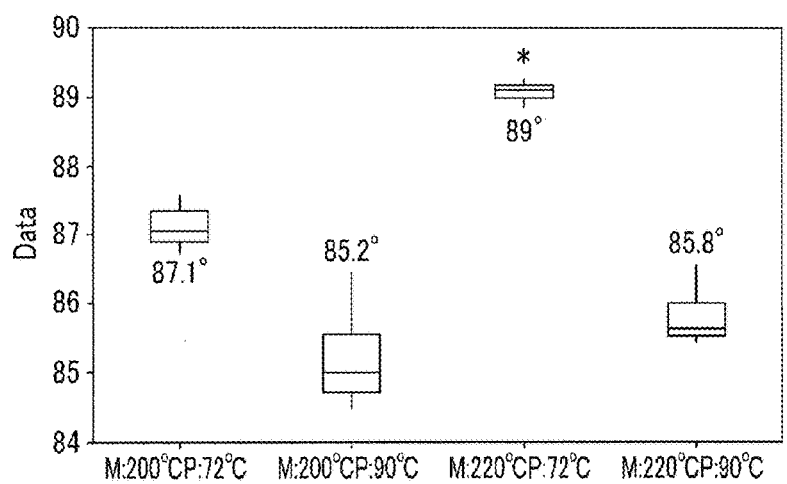
FIG. 10 is a graph illustrating a pretilt angle varying according to a curing temperature of an alignment material.

FIG. 9 is a flowchart of a manufacturing method of the LCD according to another exemplary embodiment of the invention, and FIG. 10 is a graph illustrating a pretilt angle varying according to a curing temperature of an alignment material.

The exemplary embodiment of FIG. 9 is similar to the exemplary embodiment of FIG. 8, but is different from the exemplary embodiment of FIG. 8 in terms of an operation of forming the alignment layer by curing the alignment material, and does not include an operation of exposing only the upper panel to UV.

Particularly, first, a lower panel and an upper panel are manufactured (S1), and then an alignment material including RM is applied onto the lower panel and the upper panel (S2).

Next, an alignment layer including an alignment adjusting layer and a pretilt adjusting layer is provided by curing the alignment material applied onto each panel by differentiating a baking temperature of each panel (S3). In the applied alignment material, the amount of remaining RM which may be involved in forming the pretilt during the exposure to an UV electric field later, is changed according to the baking temperature for curing the alignment material. Accordingly, liquid crystal molecules of the liquid crystal layer disposed between the panels baked at the different temperature conditions may be arranged to have different panel-side pretilt angles. A difference in the backing temperature of each panel may mean a difference in a pre-curing temperature and/or a difference in a main-curing temperature for the alignment material of each panel.

Although it is not theoretically limited, in a case where the pre-curing temperature is relatively high, the RM may be better phase-separated, and in a case where the main-curing temperature is relatively high, RM may be decomposed by thermal reaction. The former case means an increase in the amount of RM involved in the pretilt, and the latter case means an opposite case.

The graph of FIG. 10 represents the pretilt angle of the liquid crystal molecules in a case where the alignment layer is provided while varying the pre-curing temperature and the main-curing temperature, and then the exposure to the UV electric field is performed on the alignment layer under the same condition. In the graph, a horizontal axis represents curing temperatures (M: main-curing temperature, P: pre-curing temperature), and a vertical axis represents a pretilt angle (however, herein, values marked on the vertical axis are angles inclined based on a horizontal surface of the substrate, accordingly, the pre-tilt angle is represented by subtracting the angle indicated in the graph from 90 degrees, i.e., 90° minus the angle indicated in the graph). In the graph, boxes and vertical lines connected to a top line and a bottom line of each of the boxes represent quartiles. The bottom line, a middle line, and the top line of each of the boxes indicate first, second, and third quartiles of data set, respectively. The values above or below the boxes indicate the second quartile, which is the median of the data. End points of the vertical lines connected to the top line and the bottom line of each of the boxes indicate the highest and lowest values of the data set, respectively.

It can be seen that in a case where the pre-curing temperature is relatively higher, and the main-curing temperature is relatively lower (e.g., a second data from a left side of the horizontal axis), the pretilt angle is larger. Even though the alignment material is subjected to the pre-curing at the same temperature, in a case where the main-curing temperature is lower, the pretilt angle is larger. Similarly, even though the alignment material is subjected to the main-curing at the same temperature, in a case where the pre-curing temperature is higher, the pretilt angle is larger. As described above, the alignment layer is provided by differentiating the baking temperature of each panel, so that each panel-side pretilt angle of the liquid crystal molecules may be differently set later.

Next, a liquid crystal layer is provided and the two panels are bonded to each other (S4). The liquid crystal layer may be provided by dropping liquid crystals before the bonding of the panels or injecting liquid crystals after the bonding of the panels.

Next, the bonded panels are exposed to an UV electric field (S5), and RM is photo-cured in a state where compounds including the RM of the alignment layer are arranged in the same direction as those of the liquid crystal molecules. As described above, since the amount of reactive mesogen, which is photo-curable in the direction in which the liquid crystal molecules are arranged by the exposure to the UV electric field in the alignment layer of each panel may be different due to a difference in the baking temperature, a lower panel-side pretilt angle and an upper panel-side pretilt angle may be differently provided from each other.

The exemplary embodiment of FIG. 8 and the exemplary embodiment of FIG. 9 may be combined and performed. In an exemplary embodiment, after the alignment layer is provided by differentiating the backing temperature of each panel, UV may be irradiated to only one panel before the bonding of the two panels (or before the forming of the liquid crystal layer depending on a case).

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
  a curved display panel including:
   a thin film transistor panel including a first alignment layer;
   an opposing panel including a second alignment layer, and opposite to the thin film transistor panel; and
   a liquid crystal layer between the thin film transistor panel and the opposing panel, and including liquid crystal molecules;
  wherein a difference between a pretilt angle provided by the first alignment layer and a pretilt angle provided by the second alignment layer is equal to or greater than about 0.8 degree,
  the first and second alignment layers are formed of an alignment material including reactive mesogen,
  the first alignment layer includes a first alignment adjusting layer and a first pretilt adjusting layer including a material different from that of the first alignment layer, and
  the second alignment layer includes a second alignment adjusting layer and a second pretilt adjusting layer including a material different from that of the first alignment layer.

2. The liquid crystal display of claim 1, wherein:
the first pretilt adjusting layer defines a thin film transistor panel-side pretilt angle of the liquid crystal molecules, and the second pretilt adjusting layer defines an opposing panel-side pretilt angle of the liquid crystal molecules.

3. The liquid crystal display of claim 2, wherein:
the opposing panel-side pretilt angle is smaller than the thin film transistor panel-side pretilt.

4. The liquid crystal display of claim 2, wherein:
the first and second alignment adjusting layers include polymers including a vertical alignment material, and
the first and second pretilt adjusting layers include polymers including the reactive mesogen.

5. The liquid crystal display of claim 4, wherein:
the thin film transistor panel further includes a pixel electrode including a plurality of fine branch portions, and
the polymers including the reactive mesogen of the first and second pretilt adjusting layers are arranged in a direction of the plurality of fine branch portions.

6. A liquid crystal display, comprising:
a curved display panel including:
a thin film transistor panel including a first alignment layer;
an opposing panel including a second alignment layer, and opposite to the thin film transistor panel; and
a liquid crystal layer between the thin film transistor panel and the opposing panel, and including liquid crystal molecules;
wherein a difference between a pretilt angle provided by the first alignment layer and a pretilt angle provided by the second alignment layer is equal to or greater than about 0.8 degree such that image quality deterioration due to a misalignment of the thin film transistor panel and the opposing panel in the curved display panel is compensated, and
the first and second alignment layers are formed of an alignment material including reactive mesogen.

7. The liquid crystal display of claim 6, wherein:
the first alignment layer includes a first alignment adjusting layer and a first pretilt adjusting layer, and
the second alignment layer includes a second alignment adjusting layer and a second pretilt adjusting layer,
wherein the first pretilt adjusting layer defines a thin film transistor panel-side pretilt angle of the liquid crystal molecules, and the second pretilt adjusting layer defines an opposing panel-side pretilt angle of the liquid crystal molecules.

8. The liquid crystal display of claim 7, wherein:
the opposing panel-side pretilt angle is smaller than the thin film transistor panel-side pretilt.

9. The liquid crystal display of claim 7, wherein:
the first and second alignment adjusting layers include polymers including a vertical alignment material, and
the first and second pretilt adjusting layers include polymers including the reactive mesogen.

10. The liquid crystal display of claim 9, wherein:
the thin film transistor panel further includes a pixel electrode including a plurality of fine branch portions, and
the polymers including the reactive mesogen of the first and second pretilt adjusting layers are arranged in a direction of the plurality of fine branch portions.

* * * * *